(12) United States Patent
Sinha et al.

(10) Patent No.: US 10,908,131 B2
(45) Date of Patent: Feb. 2, 2021

(54) ACOUSTIC GAS VOLUME FRACTION MEASUREMENT IN A MULTIPHASE FLOWING LIQUID

(71) Applicant: Triad National Security, LLC, Los Alamos, NM (US)

(72) Inventors: Dipen N. Sinha, Los Alamos, NM (US); Anirban Chaudhuri, Cary, NC (US); Cristian Pantea, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 133 days.

(21) Appl. No.: 15/563,606

(22) PCT Filed: Apr. 4, 2016

(86) PCT No.: PCT/US2016/025942
§ 371 (c)(1),
(2) Date: Oct. 1, 2017

(87) PCT Pub. No.: WO2016/161459
PCT Pub. Date: Oct. 6, 2016

(65) Prior Publication Data
US 2018/0120269 A1    May 3, 2018

Related U.S. Application Data

(60) Provisional application No. 62/141,952, filed on Apr. 2, 2015.

(51) Int. Cl.
*G01N 29/34* (2006.01)
*G01N 29/036* (2006.01)
*H04R 1/42* (2006.01)

(52) U.S. Cl.
CPC ......... *G01N 29/343* (2013.01); *G01N 29/036* (2013.01); *H04R 1/42* (2013.01);
(Continued)

(58) Field of Classification Search
CPC ..................................................... G01N 29/345
See application file for complete search history.

(56) References Cited

U.S. PATENT DOCUMENTS 4,726,235 A * 2/1988 Leffert ...................... G01F 1/66
                                                                73/861.04
5,416,724 A * 5/1995 Savic ........................ F17D 5/06
                                                                702/51

(Continued)

FOREIGN PATENT DOCUMENTS

WO    WO 2014/165833 A2    10/2014

OTHER PUBLICATIONS

Addali, "Monitoring gas void fraction in two-phase flow with Acoustic Emission." Cranfield Univeresity, 2010. pp. 34, 37, 40 [online], [retrieved on Jul. 20, 2016]. Retrieved from the Internet: <URL: https://core.ac.tik/dnwnloariffiles/23/139578.pdf>.

(Continued)

*Primary Examiner* — Lisa M Caputo
*Assistant Examiner* — Alex T Devito
(74) *Attorney, Agent, or Firm* — Alston & Bird LLP

(57) ABSTRACT

Apparatus and methods for the measurement of gas volume fraction of produced oil are described. A first method measures the response of a pipe containing the produced oil excited by a source of vibration in the form of an acoustic frequency chirp containing a linearly varying range of frequencies in the tens of kilohertz range encompassing at least one resonant mode of the pipe. As the gas volume fraction increases, the location of the peak maximum of the measured frequency spectrum responsive to the excitation (Continued)

increases in frequency, and the height of the peak maximum increases, thereby permitting a linear calibration curve to be obtained. A second method measures the response of a pipe containing the produced oil to excitation by a continuous source of vibration having a chosen frequency above those which excite flexural vibrations in the pipe and simultaneously excite acoustic waves in the fluid contained in the pipe, known as the coincidence frequency. Gas present in the fluid will interrupt sound propagation or reverberation, thereby generating fluctuations in the amplitude of the measured vibrations of the pipe. The amplitude fluctuation level provides a measure of the gas volume present inside the pipe. A third method measures the response of a pipe containing the produced oil to excitation by a high-bandwidth, short pulse having a chosen center frequency above the coincidence frequency. Gas present in the fluid will interrupt pulse propagation, thereby generating fluctuations in the amplitude of the measured vibrations of the pipe.

35 Claims, 13 Drawing Sheets

(52) U.S. Cl.
CPC .................. *G01N 2291/014* (2013.01); *G01N 2291/0222* (2013.01); *G01N 2291/02433* (2013.01); *G01N 2291/2634* (2013.01)

(56) References Cited

U.S. PATENT DOCUMENTS

| | | | |
|---|---|---|---|
| 2003/0154804 A1* | 8/2003 | Henry | G01F 1/74 73/861.356 |
| 2005/0028579 A1* | 2/2005 | Owen | G01H 5/00 73/24.06 |
| 2007/0107777 A1* | 5/2007 | Catron | G05D 7/0635 137/2 |
| 2007/0185662 A1* | 8/2007 | Drobyshev | G01F 1/7088 702/45 |
| 2009/0013799 A1 | 1/2009 | Gysling | |
| 2012/0055239 A1* | 3/2012 | Sinha | G01N 29/024 73/61.79 |
| 2012/0055253 A1 | 3/2012 | Sinha | |

OTHER PUBLICATIONS

Chen, DeHua et al. "A transient method for measuring the gas volume fraction in a mixed gas-liquid flow using acoustic resonance spectroscopy." Scince China, vol. 53, No. 8, Jul. 9, 2010, pp. 1-6, [online] <URL: http://link.springer.com/article/10.1007%2Fs 11433-010-4061-7>.

International Search Report and Written Opinion for Application No. PCT/US2016/025942 dated Aug. 23, 2016.

* cited by examiner

ACOUSTIC GAS VOLUME FRACTION MEASUREMENT IN A MULTIPHASE FLOWING LIQUID

CROSS-REFERENCE TO RELATED APPLICATIONS

The present application claims the benefit of PCT Patent Application Number PCT/US2016/025942 for "Acoustic Gas Volume Fraction Measurement In A Multiphase Flowing Liquid," by Dipen N. Sinha et al., which was filed on Apr. 4, 2016, and U.S. Provisional Patent Application No. 62/141,952 for "Acoustic Gas Volume Fraction Measurement In A Multiphase Flowing Liquid," by Dipen N. Sinha et al., which was filed on Apr. 2, 2015, the contents of which these applications are hereby specifically incorporated by reference herein for all that they disclose and teach.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

In multiphase metering for the oil and gas industry, the amount of oil, water, and gas at the wellhead is determined. However, oil or gas seldom appear as a single constituent phase in an oil well. Generally, a significant volume of the wellhead flow is in a gaseous state, that is below bubble point pressure. Inevitably, water constitutes the third component of the multiphase system. An accurate measurement of each of the components is important to any oil exploration and production company for managing the reservoir, and for determining how the recovery of such oil and gas can be increased. Determining these three components without first separating the gas from the fluid, as is presently the standard practice, can generate major cost savings. Eliminating separators, especially for high pressures, can lead to significant cost reduction opportunity in both capital expenditure and operating cost.

In addition to wellhead measurements, there are other places for such multiphase metering can be used. A multiphase line may be used within a gas and oil gathering system and, although a test separator is used at individual wells, the combined flow from a well pad or a cluster of wells tied to a common flow line must likewise be metered. This scenario is common in subsea tiebacks where several wells in the same area are tied into a flow line that transports the combined production to a facility on an ocean platform. Multiple lines may also feed the same host, and production from each line needs to be monitored. Similar requirements are often present for onshore production.

The current SAFIRE (GE Oil and Gas, Billerica, Mass.) flow meter, a non-invasive, multiphase flow meter is capable of determining the oil-water composition accurately even in the presence of some gas. Coriolis meters can perform similar measurements. However, none of these meters provide measurements of gas volume fraction (GVF). Venturi meters and Differential Pressure devices provide total flow, which, when combined with water-cut measurements from SAFIRE, or Coriolis instruments, and densitometry, three-phase measurements may be obtained. Gamma ray meters may also be used for this purpose, but a radioactive source, typically Cs-137, is required, and has associated safety and other regulatory issues. Therefore, there is a need for a simple, inexpensive apparatus for performing three-phase measurements. Since oil-water composition (water-cut) measurements are presently available, an accurate determination of GVF would be valuable.

Acoustic tomography using either sound transmission or a Doppler type of measurement has been examined, where high-frequency (~1 MHz or above) ultrasonic transducer pairs are arranged along the circumference of a pipe through which a multiphase fluid is flowing. This allows the measurement of gas content in a horizontal plane. To obtain a value for the GVF, integrations over time and volume are performed, or multiple sets of transducers may be arranged vertically and used to obtain an instantaneous reading. Such systems are complicated, computationally intensive, error prone and impractical for regular use in the oil industry.

Doppler measurements may be used if the gas density is not too high. The complexity is readily appreciated by examining the multiphase regimes. Depending on the gas volume and flow conditions, there are several types of flow, varying from isolated bubble flow to clustered bubble flow. There are also other subsets of these conditions, showing that gas flow in a multiphase system is complex. As mentioned above, conventional ultrasonic measurements use frequencies greater than several hundreds of kilohertz to more typically in the Megahertz range. A sound wavelength for a 1 MHz frequency is 1.5 mm in water and slightly lower in oil. This wavelength is of the same order of magnitude as that of the gas bubbles; therefore, the signal is strongly scattered making measurements complicated. Individual bubbles can affect the measurement, and it is not possible to integrate the results for an accurate volume average value of GVF.

SUMMARY

Embodiments of the present invention overcome the disadvantages and limitations of the prior art by providing an apparatus and methods for determining the gas volume fraction of produced fluids from a wellhead.

Another object of embodiments of the present invention is to provide an apparatus and method for determining the gas volume fraction of produced fluids from a wellhead in-situ and noninvasively.

Yet another object of embodiments of the present invention is to provide an apparatus and method for determining the gas volume fraction in produced fluids from a wellhead in-situ and noninvasively, and without having to divert the fluids from their normal flow.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, an embodiment of the method for measuring the gas volume fraction in a fluid, hereof includes: exciting at least one mechanical resonance vibration in a section of pipe containing the fluid using an acoustic frequency chirp containing a linearly varying range of frequencies encompassing the at least one resonance vibration; and measuring the at least one resonant frequency of the pipe section responsive to the applied frequency chirp, whereby as the gas volume fraction increases, the at least one measured resonance frequency increases.

In another aspect of the present invention and in accordance with its objects and purposes, an embodiment of the method for measuring the gas volume fraction in a fluid, hereof includes: exciting at least one mechanical resonance vibration in a section of pipe containing the fluid using an acoustic frequency chirp containing a linearly varying range of frequencies encompassing the at least one resonance vibration; and measuring the amplitude of vibration at the at least one resonant frequency of the pipe section responsive to the applied frequency chirp, whereby as the gas volume fraction increases, the at least one measured amplitude increases.

In yet another aspect of the present invention and in accordance with its objects and purposes, an embodiment of the method for measuring the gas volume fraction in a fluid, hereof includes: exciting a section of pipe having an outer surface and a longitudinal axis, and containing the fluid, in a plane perpendicular to the longitudinal axis, with a continuous chosen frequency equal to or greater than the coincidence or critical frequency of radiation of the pipe section and fluid at a location on the outer surface of the section of pipe; and measuring the vibration amplitude of the pipe section responsive to the applied chosen frequency.

In still another aspect of the present invention and in accordance with its objects and purposes, an embodiment of the method for measuring the gas volume fraction in a fluid, hereof includes: exciting a section of pipe having an outer surface and a longitudinal axis, and containing the fluid, in a plane perpendicular to the longitudinal axis, with a pulse having a chosen center frequency, and a bandwidth, at a location on the outer surface of the section of pipe; and measuring the peak-to-peak amplitude of vibrations of the pipe section responsive to the applied pulsed frequency.

Benefits and advantages of embodiments of the present invention include, but are not limited to, providing an apparatus and method for in-situ, noninvasive measurement of gas volume fraction of fluids produced from a wellhead without knowledge of the size distribution of the gas bubbles within the flowing or stationary system. Use of chirp frequencies in the tens of kilohertz range permits accurate measurements of the gas volume fraction over a significant length of pipe. As will be described below, application of continuous, single frequency excitation, where the frequency is greater than the coincidence frequency of the pipe, and application of high-frequency, large bandwidth pulsed excitation are also applicable to measurement of the gas volume fraction.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3A is a graph showing the amplitude modulation of a transmitted chirp signal of finite duration through the fluid as a function of time using the apparatus of FIG. 1 hereof, while

FIG. 9A shows raw data obtained from the apparatus of FIG. 7 hereof, showing the received signal behavior of an empty pipe (dashed line) and water-filled pipe (solid curve), while

DETAILED DESCRIPTION

Figure 1:
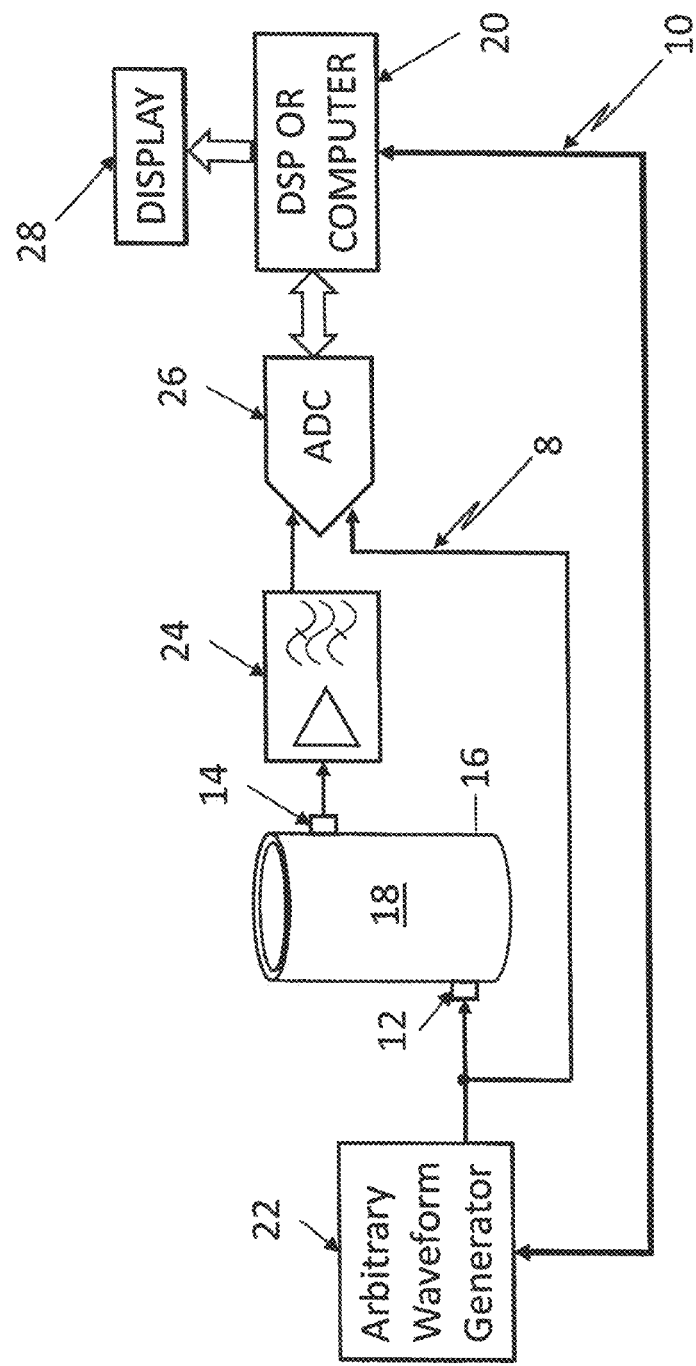
FIG. 1 is a schematic representation of an embodiment of a gas volume fraction measurement apparatus.

Briefly, embodiments of the present invention include apparatus and method for determining the quantities of oil, water and gas at the wellhead. In particular, a measurement of the gas volume fraction (GVF) of the produced fluid is sought. If very low frequencies of sound are employed, the wavelength of sound in the fluid becomes very large. For example, at 5 kHz, the wavelength of sound is almost 300 mm (12 in.). Since the bubble sizes are so much smaller than the sound wavelength, the fluid behaves as a homogeneous fluid with a density that is the combined density of the liquid and the gas present in the pipe. That is, the bubbles effectively vary the average density of the liquid inside the pipe. Thus, the details of the flow regimes and the cluster shape or bubble size, etc., are no longer a problem, which is a significant advantage over other approaches, and the average density of the liquid in a given volume can be obtained.

Pipe resonances can be measured using piezoelectric transducers attached to the outside surface of the pipe. One transducer may be used to excite resonances in the cavity, and a second transducer placed anywhere on the surface of the pipe may be used to detect the resonance and the shift therein. A function generator can be used to drive the transmitter transducer, and the frequency varied to locate the actual resonance by using the receiver transducer as the detector. It may be necessary to amplify the receiver signal. A feedback circuit, such as a phase locked loop, can be used to track the resonance frequency and to determine the volume of gas inside the pipe. In this manner, a continuous measurement of GVF can be made.

A. Mass Loading Effect on Pipe Vibration:

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto.

Turning now to FIG. 1, shown is a schematic representation of an embodiment of non-invasive device, 10, for measuring gas volume fraction in a fluid-filled pipe. Transducers, 12, and, 14, made from piezoelectric materials, for example PZT-4, are mounted on external surface, 16, of pipe, 18, and in acoustic contact therewith, transducer 12 acting as the transmitting source (T) and transducer 14 as a receiving element (R). The transmitter transducer, 12, is energized by applying a frequency chirp voltage signal of a fixed duration (anywhere between 4-20 ms) from an arbitrary waveform generator (AWG), 22, and this in turn excites mechanical resonances in the pipe. The AWG has a 50 MHz output frequency range. The receiver transducer, 14, detects the mechanical resonances in the pipe and converts the vibration signal into a voltage signal. The transducers can be mounted almost anywhere on the pipe and can be mounted on any orientation azimuthally or on any location on the pipe. These can be vertically displaced or can be on the same side of the pipe or the opposite side of the pipe. The transducers may be mounted on the same side of the pipe, but vertically displaced. This is possible because the resonance vibration of the entire pipe section is being monitored, and the resonance frequency is the same everywhere along the length of the pipe. However, FIG. 1 shows the transducers mounted on opposite sides of the pipe.

The transducers can also be non-contact types as EMAT (electromagnetic acoustic transducer) or any other transducers capable of exciting the pipe resonances and detecting those resonances, including a laser or capacitive vibration sensing device. The transducers can also be non-contact types as EMAT (electromagnetic acoustic transducer) or any other kind that can excite the pipe resonances and detect those including a laser or capacitive vibration sensing device. Central computer or digital signal processor (DSP), 22, selects chirp frequencies as input to arbitrary waveform generator (AWG) 22 and controls its functioning. The detected resonance vibration signals by receiver 14 are amplified and band-pass filtered by combined amplifier-filter electronic module, 24, and digitized using 12 bit, 25 MHz A/D converter, 26, for input to DSP or computer 20. The band-pass filter is used to filter out any extraneous vibration (e.g., ambient vibration) beyond the frequency range that is used in the frequency chirp. This improves the quality of the signal and makes the measurement relatively immune to ambient vibrations that are typically less than 10 kHz in most oil-field locations. The electrical output 8 of AWG 22 is also fed to ADC 26 and simultaneously digitized. DSP 20 uses both these input signals to the ADC to demodulate the amplitude variations to extract the variation in amplitude over time, and uses a frequency transform of the demodulated amplitude information to obtain a frequency spectrum using a Fast Fourier Transform (FFT) to analyze the frequency spectrum of the signals to calculate the shift in peak frequency or variation in amplitude RMS (root-mean-squared) value. The shift in peak frequency and the change in peak amplitude are functions of the internal contents (fluid+gas) of pipe 18. Graphics display, 28, is used to provide visual output for DSP or computer 20.

Figure 2:
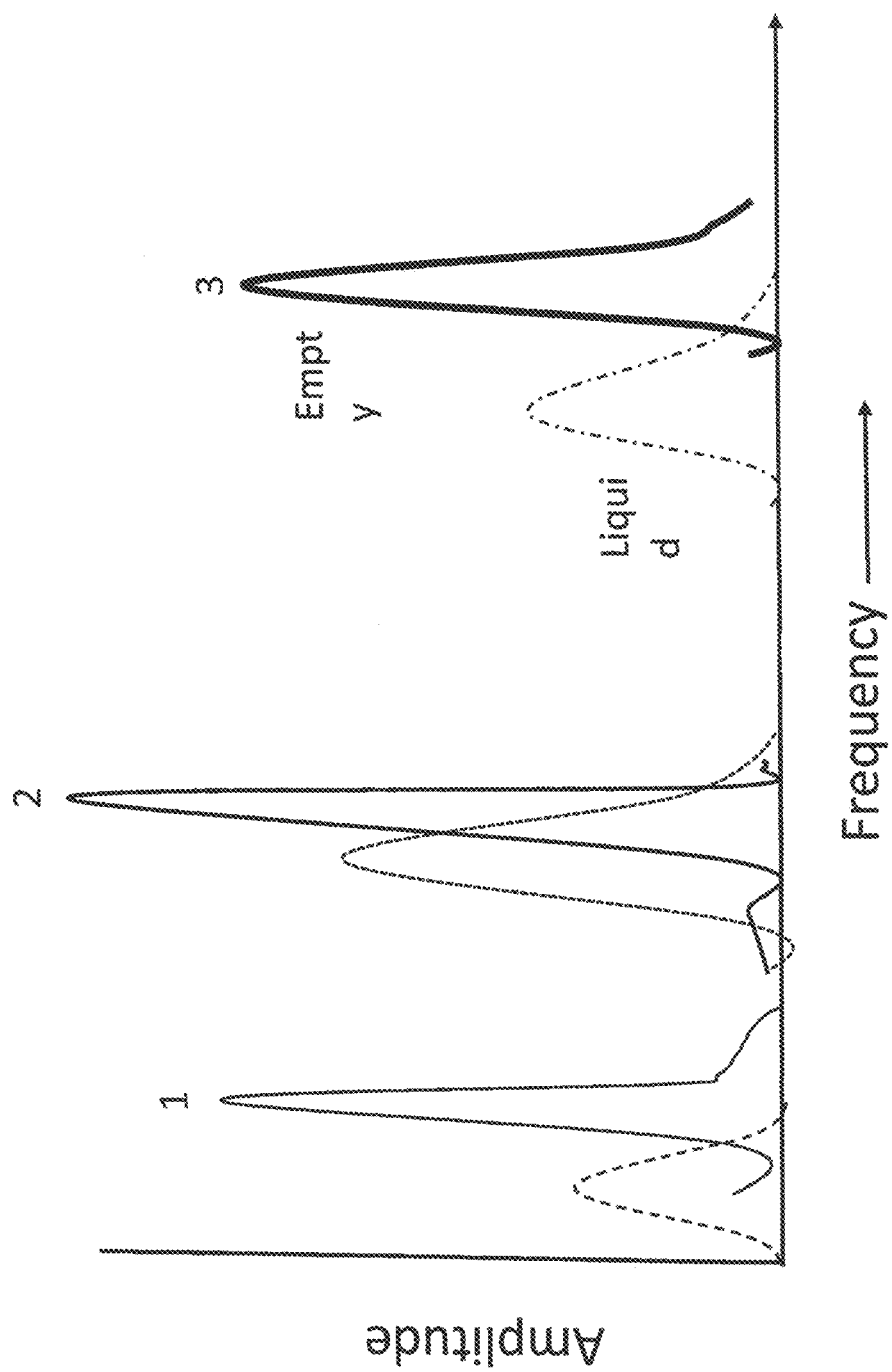
FIG. 2 illustrates resonance vibrations of a pipe with multiple resonance modes denoted as (1), (2), and (3), in different frequency regions having different behaviors with regard to amplitude variation and frequency shift, when it is empty (dashed and dotted curves), and when it is completely filled with any liquid (solid line curves).

The effect of mass loading on pipe vibration permits GVF measurement from 0 to 1 using a single instrument. It also uses the section of a pipe through which the multiphase fluid is flowing between two flanges, as its own sensor, because a container, such as a cylinder or other shape, can be excited with an external vibrating source and its response monitored using a vibration measurement device, such as contact transducers, or stand-off laser vibrometers as examples. There are many modes of natural vibrations of a cylinder called natural resonances, that can be excited where the cylinder vibrates efficiently. Each resonance mode is affected differently by the presence of liquid inside differently. FIG. 2 illustrates the manner in which different resonance modes are affected by the quantity of liquid inside the cylinder both in terms of frequency shift and amplitude variation. Resonance modes in different frequency regions behaving differently with regard to amplitude variation and frequency shift, and an example of this is shown in FIG. 2, as (1), (2), and (3). Empty pipe resonances are illustrated by dashed and dotted curves, and those for pipes completely filled with any liquid are shown as solid line curves. The difference between the empty and the liquid-filled curve behavior in different frequency regions is an important consideration for sensitive GVF measurements.

The sensitivity of the effect varies over a wide frequency range and thus it is important to select a frequency range where the sensitivity is the highest. There are frequency regions or resonance modes that are insensitive to the mass loading, which can be used as reference values for the measurements, or to normalize amplitude values.

Since the useful resonance frequencies are quite low, typically less than 30 kHz for a 2-inch ID steel spool, the corresponding wavelength of sound in the fluid is very large. The wavelength is orders of magnitude larger than typical gas bubbles sizes in a bubbly flow. This makes the fluid behave in a very homogenous manner in terms of the loading effect and there is no concern about localized fluctuations. Moreover, because the thickness of the pipe wall is typically >5 mm, any possible high-frequency fluctuations are smoothed out in the vibration response as the system cannot respond to such fluctuations. Any system using a long, narrow pipe having a thin wall, will suffer due to such localized fluctuations. This is the reason that commercial Coriolis meters cannot tolerate the presence of even the smallest quantities of gas. Because of the nature of the structural resonances of the pipe, the density of resonance modes increases (how closely these are bunched together) with frequency. At lower frequencies (<10 kHz), individual resonance modes are well-separated in frequency, but at higher frequencies, the modes tend to cluster together. The lower resonance modes are sufficiently low to be sensitive to ambient vibration. Therefore, higher modes are preferred, and the data can be easily band-pass filtered to obtain clean signals without being affected by external or ambient vibrations. The higher frequency modes also tend to be more sensitive to mass loading variation. Thus, it is also possible to use a group of resonance modes instead of single resonances and this expands the usability of embodiments of the present method. Where there is a group of resonances, it is simpler to use a center of gravity of the group or the RMS value of the group and track the mass loading.

Figure 3A:
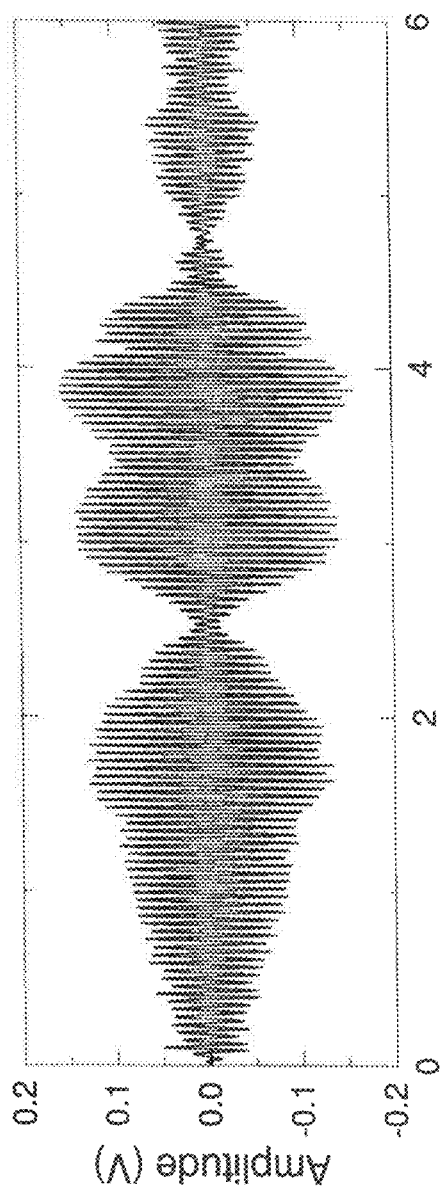
Figure 3B:
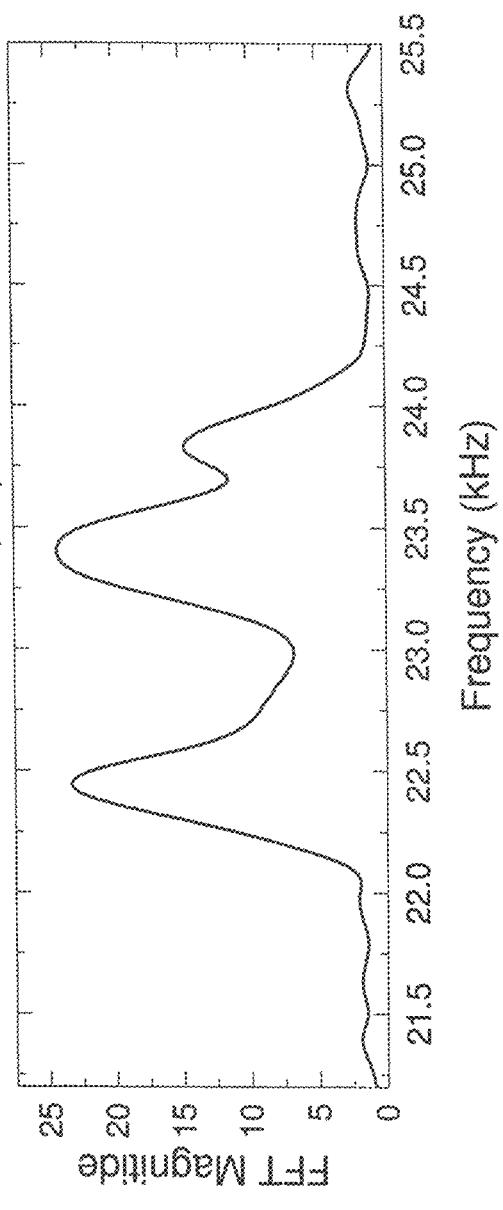
FIG. 3B illustrates the frequency response of the transmitted signal (FFT of the time data) recorded by the receiver.

FIGS. 3A and 3B are transmitted and received signal data, respectively, from a 2 in. O.D. steel pipe. The transmitted signal may be a chirp, containing a linearly varying range of frequencies between $f_0$ and $f_1$; the range encompassing one or more resonant mode frequencies of pipe 18. The pipe modulates the input signal based on its resonant mode, accentuating the resonance frequencies while attenuating the remainder of the signal content. The chirp frequencies used to interrogate the fluid-filled pipe may be in the range between 10 kHz and 50 kHz, and correspond to a mean wavelength of 10 in. water; therefore, a single measurement using embodiments of the present method provides an accurate measure of GVF over a significant length of pipe. As stated, this method does not require knowledge of the size distribution of the gas bubbles within the flowing liquid, and is applicable to cases where the liquid column is moving (flowing system) or stationary. Additionally, if the input signal is a linear frequency chirp between two limits within the chirp duration, the time that exactly corresponds to a particular frequency is known, since there is a linear relationship therebetween. If an FFT of the received signal is performed to convert the received amplitude modulated signal to a frequency signal directly, the curves set forth in FIG. 4 hereinbelow result.

Figure 4:
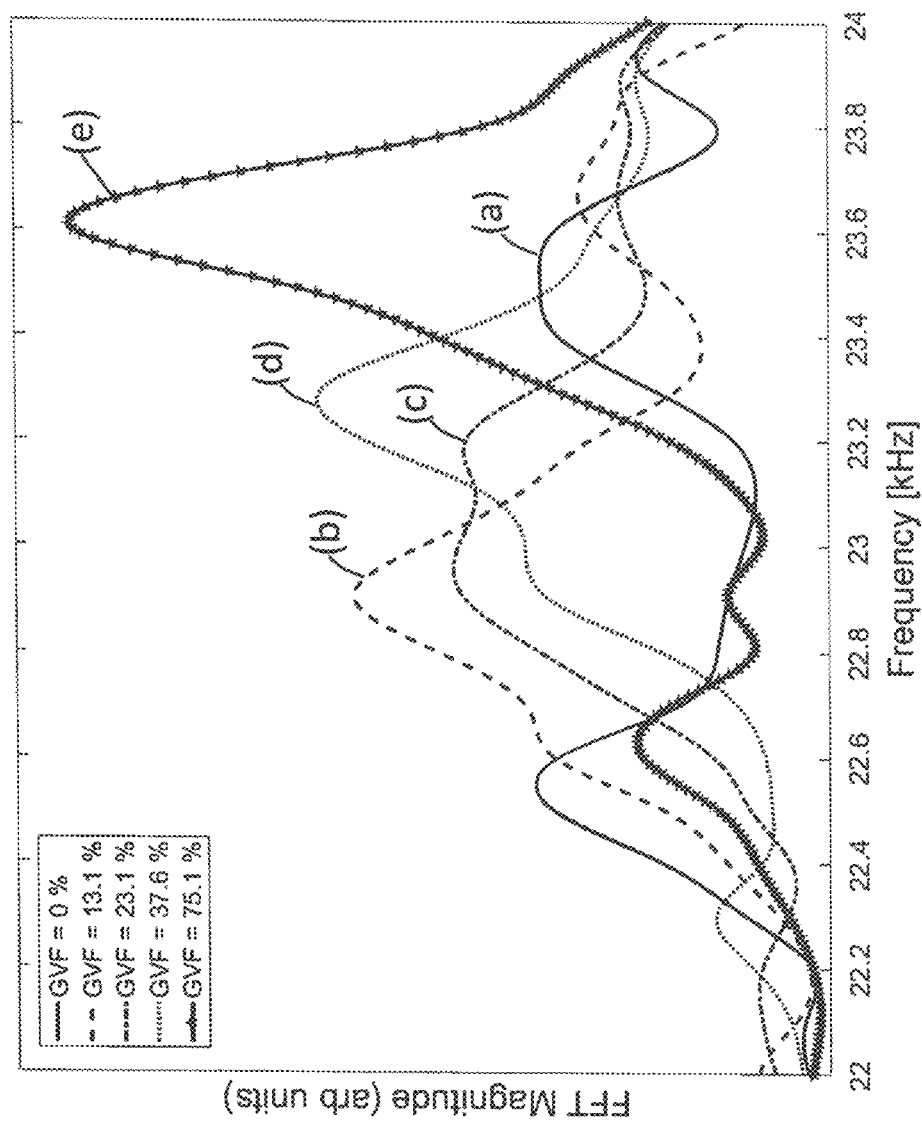
FIG. 4 is a graph of the amplitude of the received frequency spectra for the indicated gas volume fractions as a function of resonance frequency in a pipe, the shift in frequency of a single resonance peak being tracked as a function of GVF.

FIG. 4 is a graph of the frequency spectra of the received signal for the indicated gas volume fractions, as a function of frequency for a 2 in. diameter steel pipe carrying a water-gas mixture. Curve (a) represents 0% GVF; curve (b) represents 13.1% GVF; curve (c) represents 23.1% GVF; curve (d) represents 37.6% GVF; and curve (e) represents 75.1% GVF. The GVF here is expressed as a percentage. As the GVF increases, the location of peak magnitude in the frequency spectrum increases. Higher GVF values imply lower fluid mass loading and lead to higher resonance frequencies of the pipe.

Figure 5:
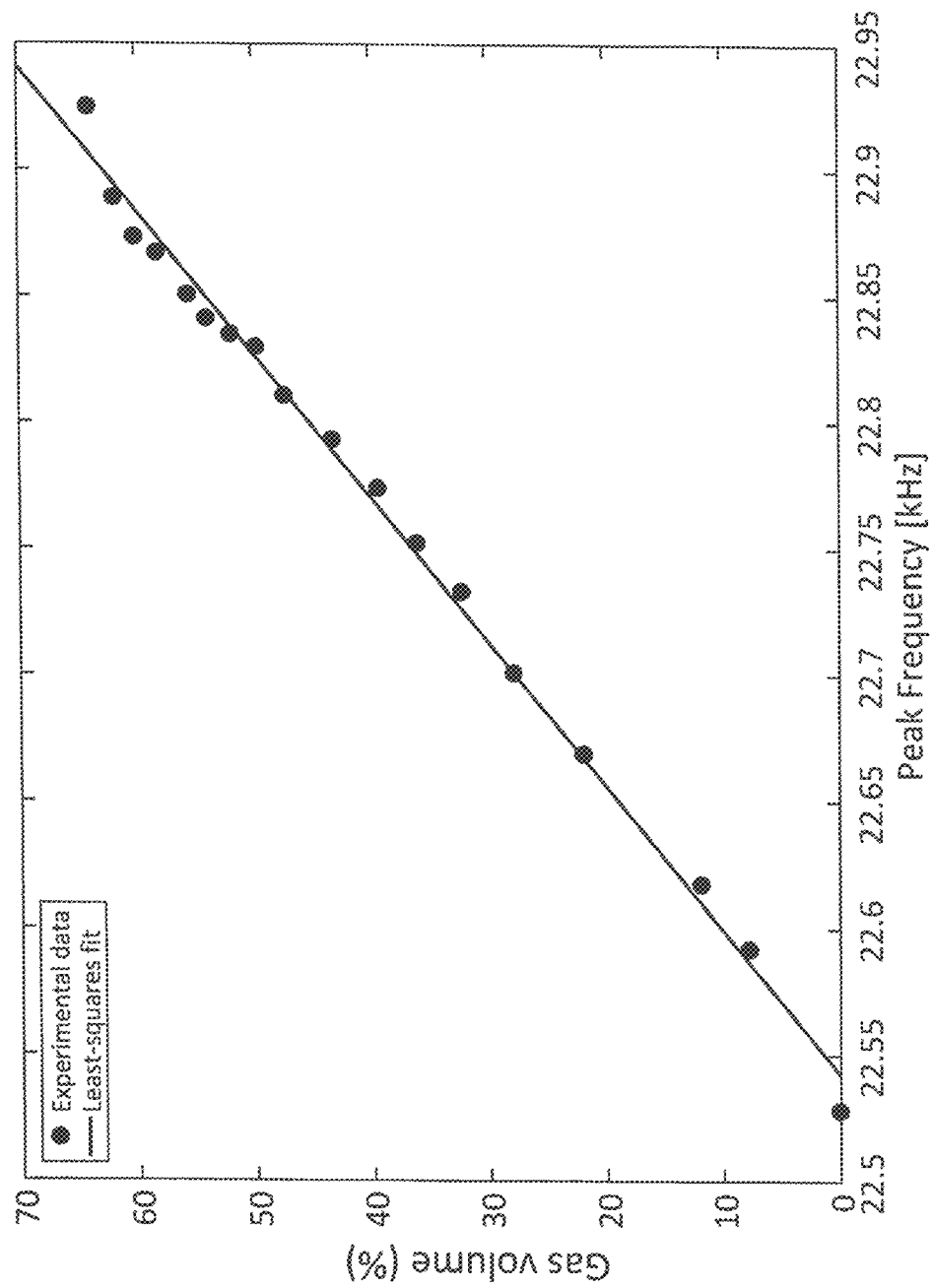
FIG. 5 is a calibration curve derived from resonance peak data similar to that shown in FIG. 4, hereof by plotting the measured gas volume fraction in the flowing system with external gas flow meters as a function of detected peak frequency.
Figure 6A:
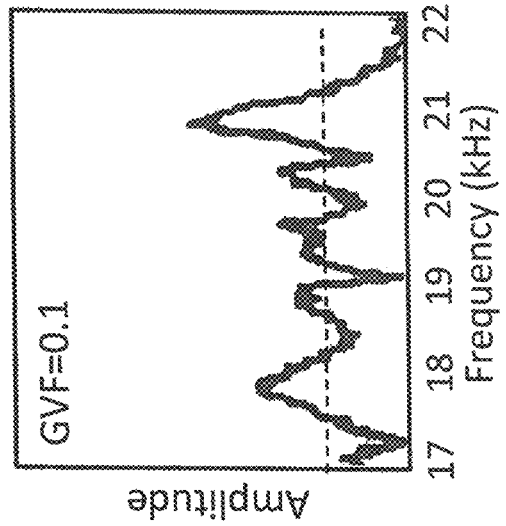
FIGS. 6A-6D show a series of observations from crude oil/water mixtures over a limited range of the observed frequency spectra of the resonance signal that was detected by the receiver transducer at four different GVF values from 0-0.3, illustrating that GVF can be measured from the amplitudes of the received signals.
Figure 6B:
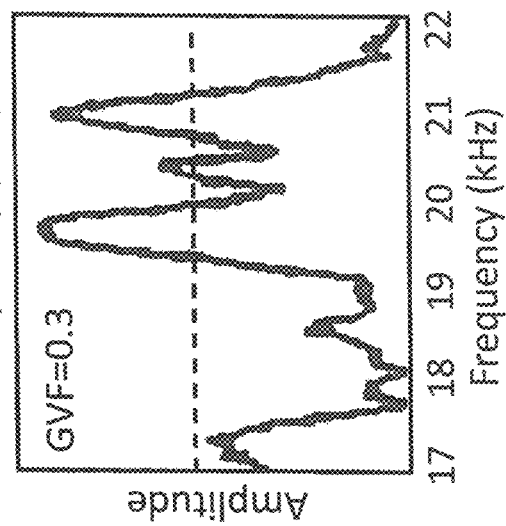
Figure 6C:
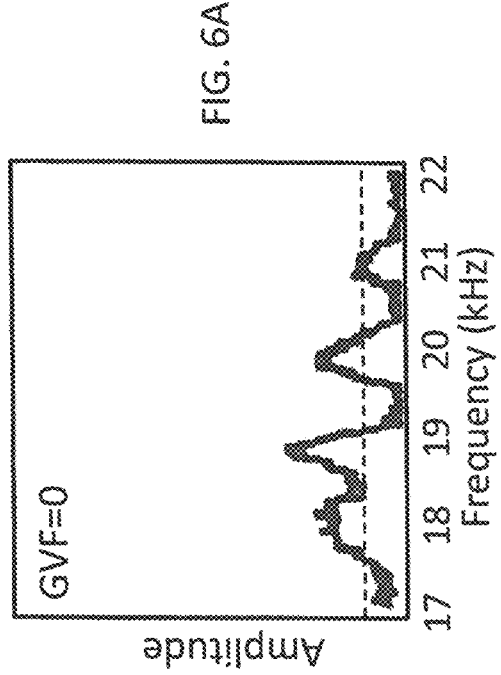
Figure 6D:
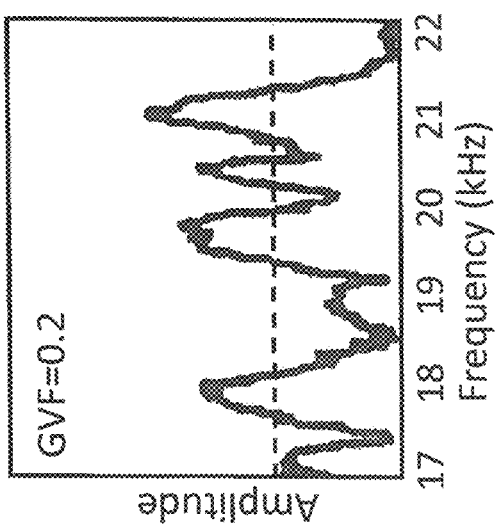

In operation of the present apparatus, the measured peak frequency is compared to the calibrated values, shown in FIG. 5, in order to calculate the corresponding GVF (shown as a percentage). The dots represent the experimental calibration data, while the solid line represents a least-squares fit of this data. It may be observed that the calibration curve is approximately linear up to the GVF measured; although some curvature is expected at high GVF values, a 2-point fit between the extreme conditions (100% liquid and 100% gas) should provide a calibration curve suitable for field use. It has been observed by the present inventors, that with external loading of the pipe or variation of mechanical loading due to installation in various flow systems, the calibration can vary somewhat, but a simple 2-point calibration is all that is needed to realign the calibration curve. Essentially, the calibration behavior (variation of frequency with GVF) remains unchanged and just needs to be rescaled.

In some situations depending on the complexity of the pipe installation and extraneous loading of the pipe, it is possible that individual resonance peaks cannot be clearly identified. In that case, it is possible to select a group of resonances in a progression to be selected and its center of mass be tracked as a function of GVF. It is also possible to select the RMS (root-mean-square) value of the group of resonances as the parameter to monitor as a function of GVF. This is possible because the frequency shift in the pipe structural resonance is due to mass loading. As the loading gets lower due to presence of gas, the resonance frequencies shift toward higher frequencies and the amplitudes become higher (see FIG. 4). The frequency shift and the amplitude variation are linked, and either aspect can be used to monitor the GVF.

FIGS. 6A-6D show a series of observations from crude oil/water mixtures over a limited range of the observed frequency spectra of the resonance signal that was detected by the receiver transducer at four different GVF values from 0-0.3, illustrating that GVF can be measured from the amplitudes of the received signals as well in addition to frequency shift. In this frequency range, the overall amplitude of the spectra increase with increased GVF. An RMS value of the data in each case, illustrated as a horizontal dashed line in each FIGURE, is taken as the measurement parameter for GVF determination.

B. Reverberation Method:

The sound radiation efficiency of a plate (flat or curved) is dependent upon the coupling of sound waves in the fluid and flexural waves (vibration) in the plate. Optimum efficiency (maximum energy transfer from vibration to sound or vice versa) is achieved when the plate is vibrated such that the wavelength of flexural waves in the plate is equal to the wavelength of acoustic waves in the fluid (e.g., fluid inside a pipe). This is more commonly known as the coincidence or critical frequency of radiation $f_c$, and is described by the following properties of the plate and the medium:

$$f_c = \frac{c^2}{\pi d} \sqrt{\frac{3\rho}{Y}}, \quad \text{Eq. 1}$$

where,
$f_c$=coincidence frequency [Hz];
c=speed of sound in air [ms$^{-1}$];
d=thickness of panel [m];
ρ=density of panel [kgm$^{-3}$]; and
γ=Young's modulus of panel [Nm$^{-2}$].

For all frequencies above $f_c$, there exists an angle of incidence such that the projection of the incident wave coincides with the flexural wave:

$$\lambda_\theta = \frac{\lambda}{\sin(\theta)}, \quad \text{Eq. 2}$$

where
$\lambda_\theta$=wavelength in panel [m];
λ=wavelength in air [m]; and
θ=angle of incidence with respect to normal [rad].

Figure 7:
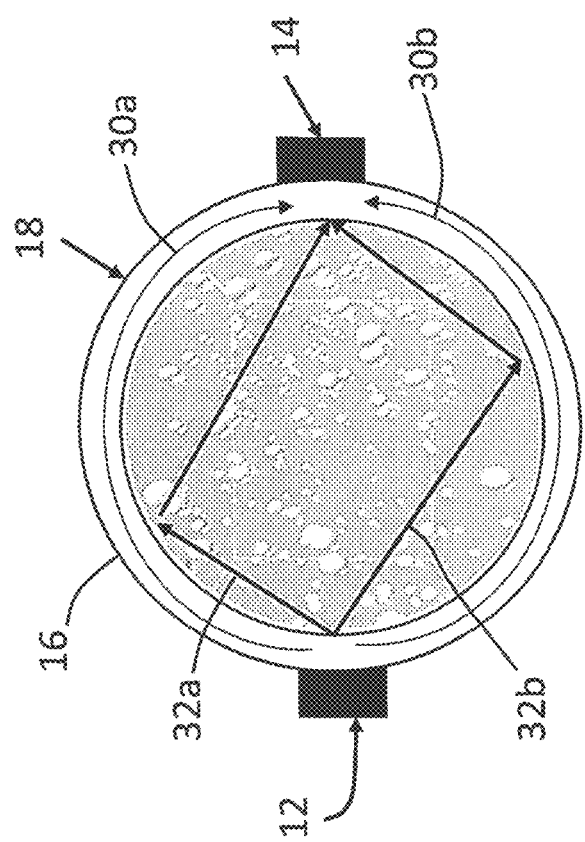
FIG. 7 is a schematic representation of a fluid-filled pipe (liquid-gas mixture) excited by transducers attached to the surface thereof, illustrating a guided wave path through the pipe wall and numerous paths the waves may take through the fluid (reverberation), respectively, where the excitation frequency is chosen to be above the coincidence frequency at which sound waves penetrate into the fluid at an angle.

In embodiments of this method, the fluid filled pipe is excited at low frequencies, but above the coincidence frequency of the pipe-fluid system. FIG. 7 shows a schematic representation of a top view of fluid-filled pipe 18 with ultrasonic transducers 12 and 14 (transmitter-receiver pair) disposed on opposite sides of surface 16 of pipe 18 in the same plane. Any relative location of the transducers in the plane may be used, the exact location not being important. The transducers can be either contact (piezoelectric, magnetostrictive, as examples), or non-contact types, such as electromagnetic acoustic transducers (EMAT), sound projectors using parametric array, or other means for generating vibrations on the surface of a pipe. A laser Doppler vibrometer may be used at large distances for detecting the vibrations.

Transmitter transducer 12 generates vibration in the pipe wall that propagates through two pathways above the coincidence frequency. FIG. 7 also shows paths, 30a, and, 30b, as guided waves through the pipe wall. The excitation is continuous and therefore these waves propagate along the circumference of the pipe continuously. At certain frequencies these waves can constructively interfere and produce resonances. It is not necessary to use a resonant frequency. The other pathway is through the liquid, shown as paths, 32a, and 32b. The amount of sound radiating into the liquid depends on how much the applied frequency is higher than the coincidence frequency. The higher the frequency, the more normal the sound is to the inner surface of the pipe. At lower frequencies, but still above $f_c$, the sound enters the fluid at a grazing angle. This sound then reverberates inside the pipe surface due to reflections from the wall at multiple places, and the amount of reverberation depends on the frequency above $f_c$ (see Eq. 2). Clearly, many paths through the liquid are possible.

If there are bubbles (or gas) flowing through pipe 18, the sound propagation path will be interrupted, and the signal arriving at the receiver will be amplitude modulated, which gives rise the reverberation embodiment of the method hereof. Data is first obtained over a short period of time (<1 s) for an empty pipe. This provides a baseline for the received signal, and is essentially a fixed signal since nothing is changing over time. When the pipe is filled with a fluid, there is a second path for sound to reach the receiver. This is also a fixed signal since nothing is changing in time. A laminar flow of the fluid does not affect this measurement although presence of any turbulence will affect the amplitude somewhat, but the modulation will be at a very low frequency. The value obtained from an empty pipe can be subtracted from that for the fluid-filled pipe to determine the quantity of sound arriving at the receiver through multiple paths inside the pipe by reverberation.

As gas is introduced, the system becomes more dynamic and the sound path through the liquid is blocked, scattered, or attenuated by differing amounts at different times. This signal attenuation is a function of the amount of gas passing through the pipe, the gas being in the form of bubbles or clusters of bubbles, depending on the fluid and the flow conditions. If there are more bubbles (or gas) flowing through, there is more perturbation of the system and the dynamic nature of the measured signal varies accordingly with progressively greater fluctuations as the gas volume increases. Therefore, a measure of this fluctuation level provides a measure of the gas volume present inside the pipe.

When the gas volume becomes very large, little sound can reach the receiver transducer, and the signal approaches that of the empty pipe value, although it never reaches that value since there is always at least a thin layer of liquid attached to the pipe inner wall with which the sound can interact.

Figure 8:
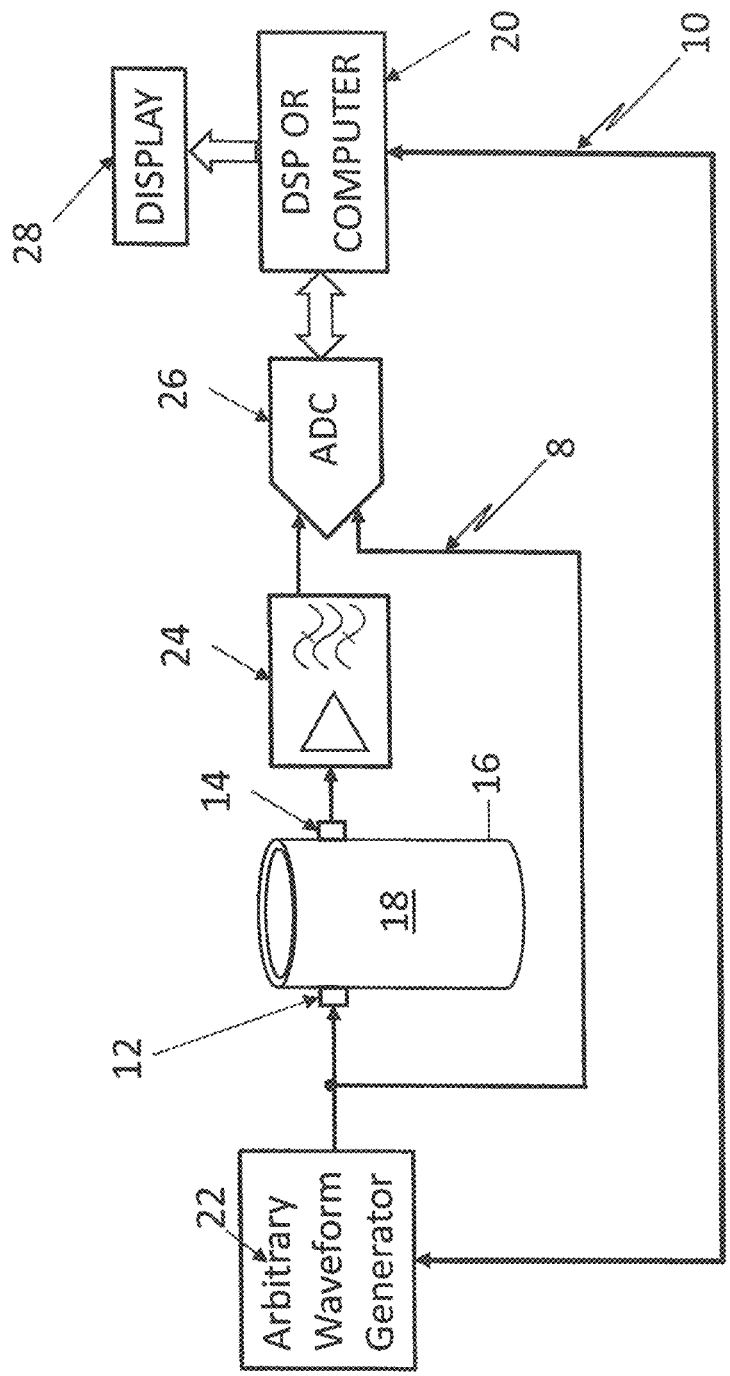
FIG. 8 illustrates an embodiment of an apparatus for practicing the reverberation method hereof.

FIG. 8 shows an embodiment of an apparatus for practicing the reverberation method hereof. Arbitrary waveform generator (AWG) 22 drives transducer 12 at a chosen continuous frequency, the transducer being attached to the surface of pipe 18 (also shown in FIG. 6) through which a fluid is flowing, and in acoustic communication therewith. Only a surface contact transducer arrangement is shown, but this can be replaced with other forms of sound transmission and reception. The output of receiver transducer 14 having detected the vibrations on the pipe surface is first amplified and band-pass filtered by combined amplifier-filter electronic module 24 and then digitized in A-D converter (12-bit, 25 MHz, ADC) 26. The output of the converter is directed to digital signal processor (DSP) 20 for computation, and then displayed on screen, 28. The output of the AWG is also separately and simultaneously digitized by the ADC, which can be used for demodulating the amplitude modulation of the transmitted signal. The display output can also be output through a USB port for remote monitoring purposes, not shown in FIG. 8. Many DSPs include an A-D converter therefore, an external converter may not be required. The AWG is also controlled by the DSP to set appropriate excitation frequencies so that the measurement can be adjusted for different flow regimes, such as bubbly flow, slug flow, churn flow, etc., where the distribution of the gas inside the pipe is different and different angles of incidence may provide better sampling of the gas by the sound inside the pipe. The equations set forth hereinabove show that the exit angle of the sound beam depends on the frequency as long as the frequency is above $f_c$.

It is preferred that transducers 12 and 14 are disposed in the same plane, as shown in FIG. 7, since above the coincidence frequency, the pipe vibrations couple to the liquid and the sound waves penetrate the liquid cavity. The amount of sound reverberation then depends on the angle of the waves launched from the transmitting transducer, which is maximized if the transmitting and receiving transducers are in the same plane. By contrast, FIG. 1 shows vertically displaced transducers, since the receiver can be disposed essentially anywhere on the pipe, because the receiver detects the resonance vibrations of the pipe as a single entity. In fact, both transducers have been located on the same side of the pipe, but vertically displaced for some measurements.

Figure 9A:
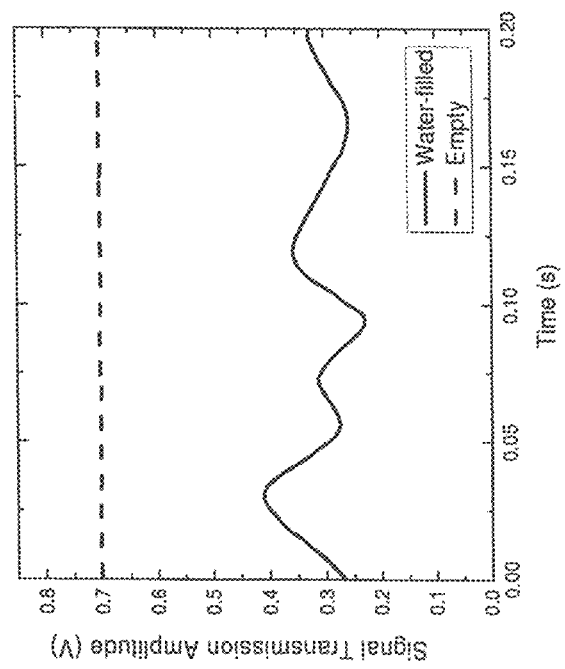
Figure 9B:
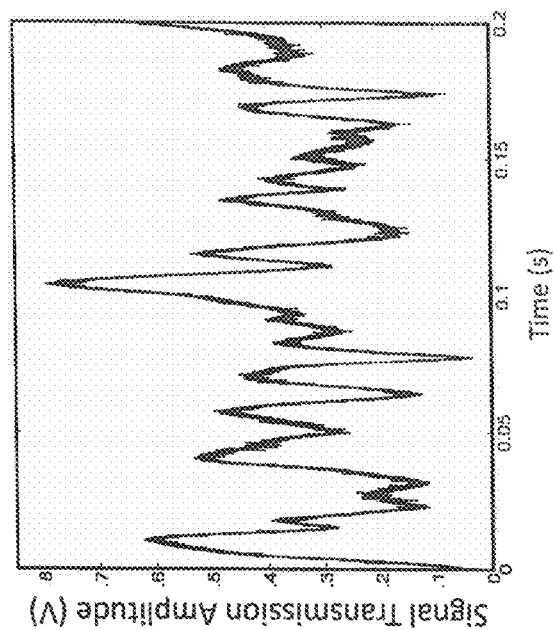
FIG. 9B shows the received signal from the receiver transducer when there is gas present in the pipe, the amplitude fluctuations shown changing with the amount of gas present (GVF).

FIG. 9A shows raw data obtained from the apparatus of FIG. 7 hereof, showing the received signal behavior of an empty pipe (dashed line) and water-filled pipe (solid curve) as a function of time, taken for a fluid flowing (6 gal. per min. of a 95-5% water-mineral oil mixture) through a 2 in. OD stainless pipe with a wall thickness of 0.3 in. FIG. 9B shows the signal received from the receiver transducer 14 illustrated in FIG. 7, when there is gas present in the pipe, the amplitude fluctuations shown changing with the amount of gas present (GVF). These amplitudes are obtained by first subtracting the mean of the signal detected by the receiver transducer, rectifying the data, and then low-pass filtering it to remove the high carrier (excitation) frequency. A Hilbert transform can also be performed to extract the envelope. A much smoother envelope can be obtained by further filtering the signal, but is not needed for the present analysis. An alternative procedure for extracting the amplitude information is to demodulate the received signal by first multiplying the received signal by the transmit (excitation) signal, and then low-pass filter the data around the frequency of the amplitude modulated signal. FIG. 9A (dashed line) corresponding to data for an empty pipe shows a flat line with no amplitude modulation, as is expected. All the sound from the transmitter to the receiver goes through the pipe wall as guided wave. When the pipe is filled with flowing liquid, but no gas is going through the pipe, the data appears as shown by the solid line in FIG. 9A, but with a much lower amplitude, the presence of liquid now short-circuiting the sound transmission path. Even without gas, the flowing liquid may generate be some fluctuations in amplitude due to turbulence in the liquid that can also affect the sound transmission. For laminar flow there is no observed amplitude modulation, also as expected.

FIG. 9B corresponds to gas (air) volume fraction of approximately 0.08. Measurements were taken between very low GVF values to almost 0.6 GVF-the limit of the apparatus. The measurements have been repeated at different excitation frequencies above the coincidence frequency of 35 kHz for this pipe, and exhibit the same behavior. The characteristics of the amplitude modulation vary as the GVF increases as the signal through the fluid encounters a significant quantity of gas that either blocks the signal from transmitting further or gets significantly attenuated. The sound transmission process is highly dynamic and varies from one point in the plane of the transmitter-receiver pair to another. Since the gas is moving continuously through the fluid and its spatial distribution varies constantly, the nature of the sound transmission can be described only statistically. A measure of this dynamic situation is obtained from the ratio of the standard deviation (SD) of the envelope (amplitude modulation) data and the mean, which effectively normalizes the data such that variations in transducer coupling, etc., do not affect the results. More sophisticated statistics may be employed for analyzing the fluctuating amplitude, beyond the SD/Mean ratio used in the present analysis.

Figure 10:
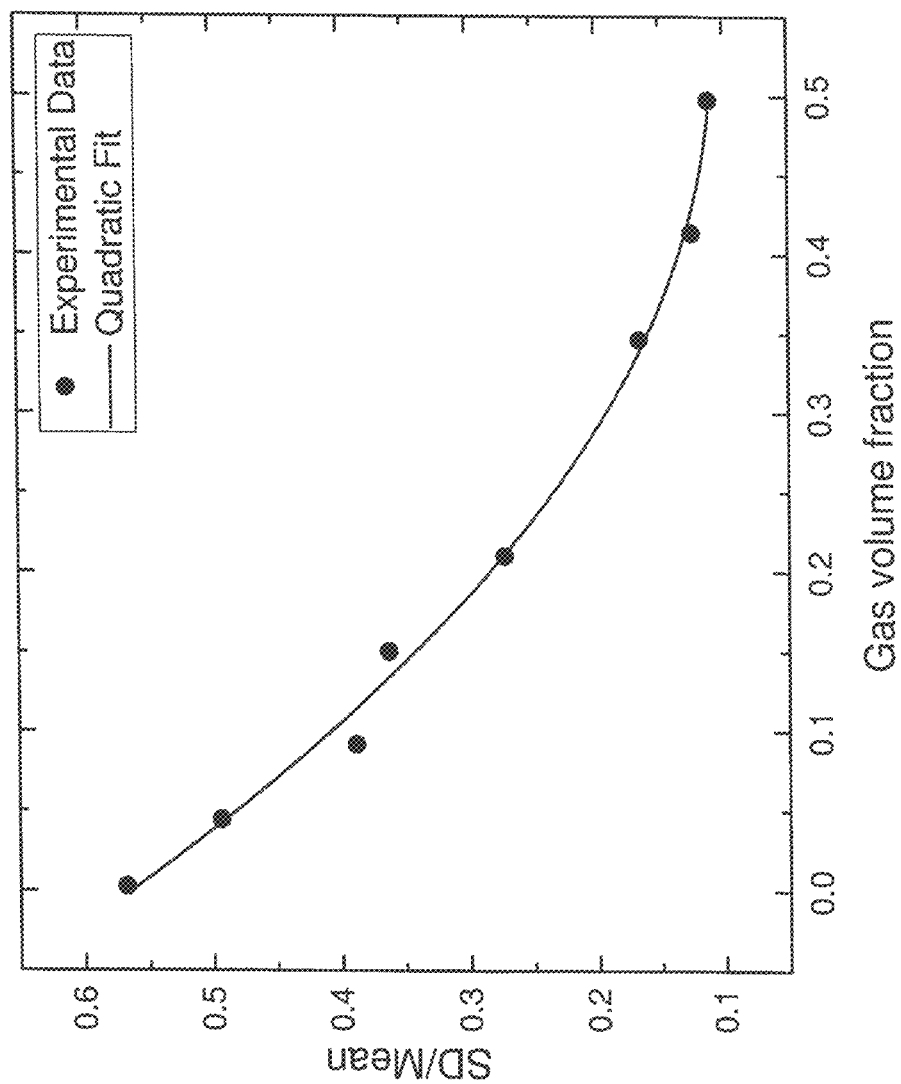
FIG. 10 is a graph of the standard deviation (SD)/Mean ratio of the curve shown in FIG. 9B as a function of gas volume fraction.

FIG. 10 shows the results of the above measurements at 100 kHz excitation, where the ratio SD/mean is plotted against the measured GVF using an external, commercial gas flowmeter. With knowledge of the flow of the liquid through the pipe, the amount of gas traveling through the pipe, and the geometry of the pipe, the GVF can be calculated and calibrated. Therefore, FIG. 10 can be considered as a calibration for the apparatus shown in FIG. 7 hereof. With the fitted curve (quadratic fit, solid line) being the calibration (the dots representing the experimental data), the SD/mean value can be measured for a given flow and the GVF determined from the calibration curve. Once calibrated for a particular pipe geometry, the calibration curve can be used for GVF measurements. Parameters derived from various statistical means can be used for GVF measurements as well. Measurements made at pressures as high as 60 psi show the same behavior as those at ambient pressure (approximately atmospheric pressure) although there may be a slight effect on the calibration. Moreover, the subtle effects of excitation frequency on the calibration curves is also being explored as it can provide additional information regarding multi-phase flow.

FIGS. 9 and 10 illustrate only one type of analysis. Other procedures for analysis may also be performed on the amplitude envelope data. One may observe that the timescale of the amplitude fluctuations and the magnitude of the fluctuations vary significantly as one increases the GVF from a low to a high value. That is, the more gas flowing through the fluid, more fluctuations one observes. So, the frequency content of the fluctuations moves toward higher frequencies and increases in frequency bandwidth with higher GVF, and this may be used as a parameter instead of the simple SD/Mean ratio. The analysis is accomplished by taking the Fast Fourier transform (FFT) of the data and looking at the frequency spectrum or carrying out a joint time-frequency analysis of the data. Among the available statistical techniques, fractal analysis and recurrence analysis can also be instructive for characterizing the amplitude fluctuation data as a time-series, and then relating its fractal dimension to the GVF.

Figure 11:
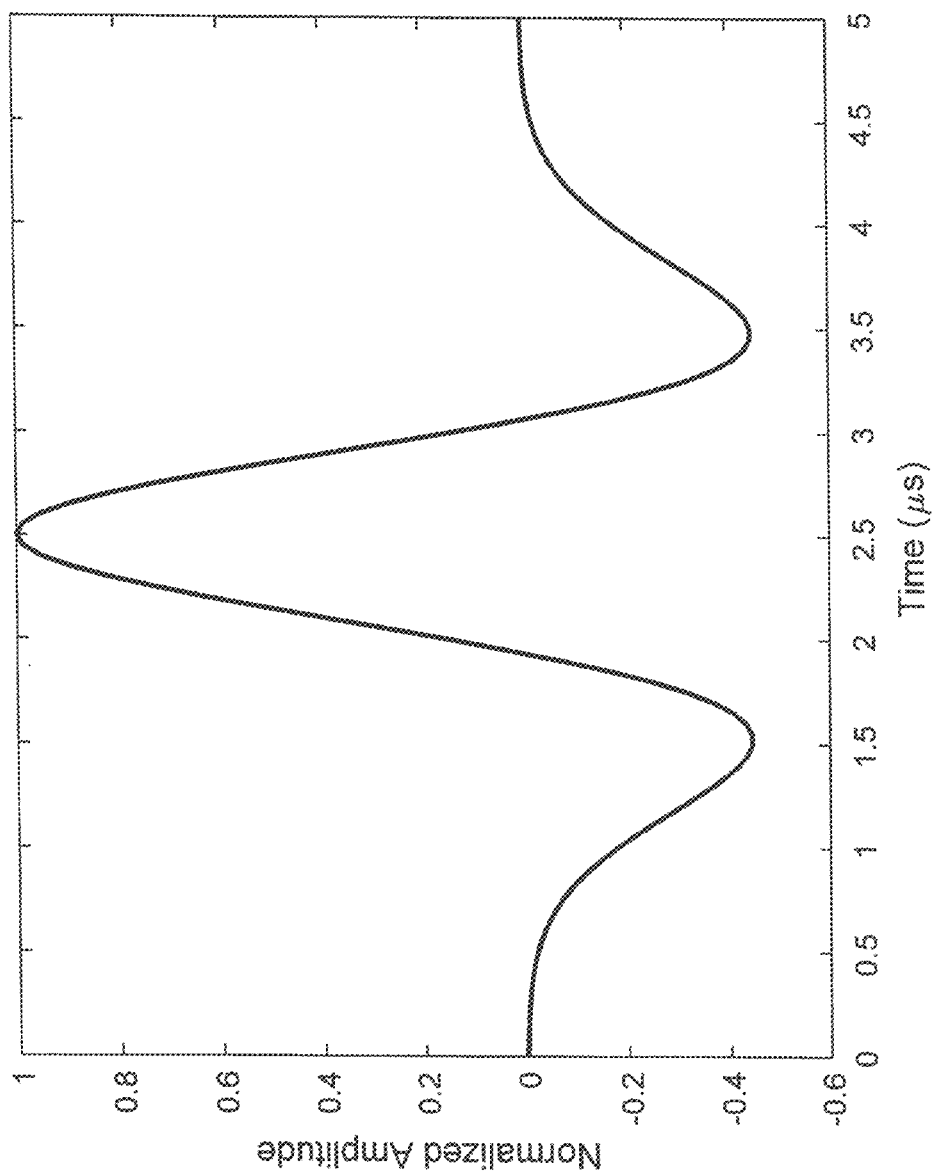
FIG. 11 is the shape of a Gaussian pulse used for excitation of high-frequency broad band (1-5 MHz) signal that is localized over a small time scale (5 µs).

C. High Frequency Transmitted Signal Fluctuation:

The previous approaches rely on low-frequency excitation of a pipe section through which the multiphase fluid is flowing and detection of the signal at some location on the pipe. In this approach, the transmission of a high center frequency (between about 1 MHz and about 4.5 MHz) and wide bandwidth pulse through the pipe diameter is monitored on the diagonally opposite side of the surface of the pipe. The pulse used in many of the experiments is a Gaussian pulse with bandwidth of 1-5 MHz and duration of 5 µs (FIG. 11). Other values can also be used based on the pipe geometry and transducers used. The experimental apparatus used is the same as shown in FIG. 8 except that the transducers 12 and 14 have high frequency bandwidth (500 kHz-5 MHz). This frequency range is solely for the particular geometry of the pipe (44 mm (1.75 in.) in diameter (I.D.) and wall thickness of 6 mm). In this high-frequency case, the sound travels as a beam from the transmitter transducer to the receiver that is different from what is shown in FIG. 7 for low-frequency transmission. It should be mentioned that a Sinc pulse (sinx/x) can also be used for this measurement as well as other pulse waveforms. In a flowing fluid that is a mixture, the lower density component tends to flow along the axis of the pipe where the velocity is the highest in the case of laminar flow. Therefore, in a bubbly fluid, the gas tends to accumulate near the axis and this intercepts the sound beam and causes fluctuation in the sound transmission. In the case of turbulent fluid, the gas is spread more completely through the fluid, but the effect is still the same where the gas reduces the sound transmission intensity and the result is a fluctuating signal.

Figure 12:
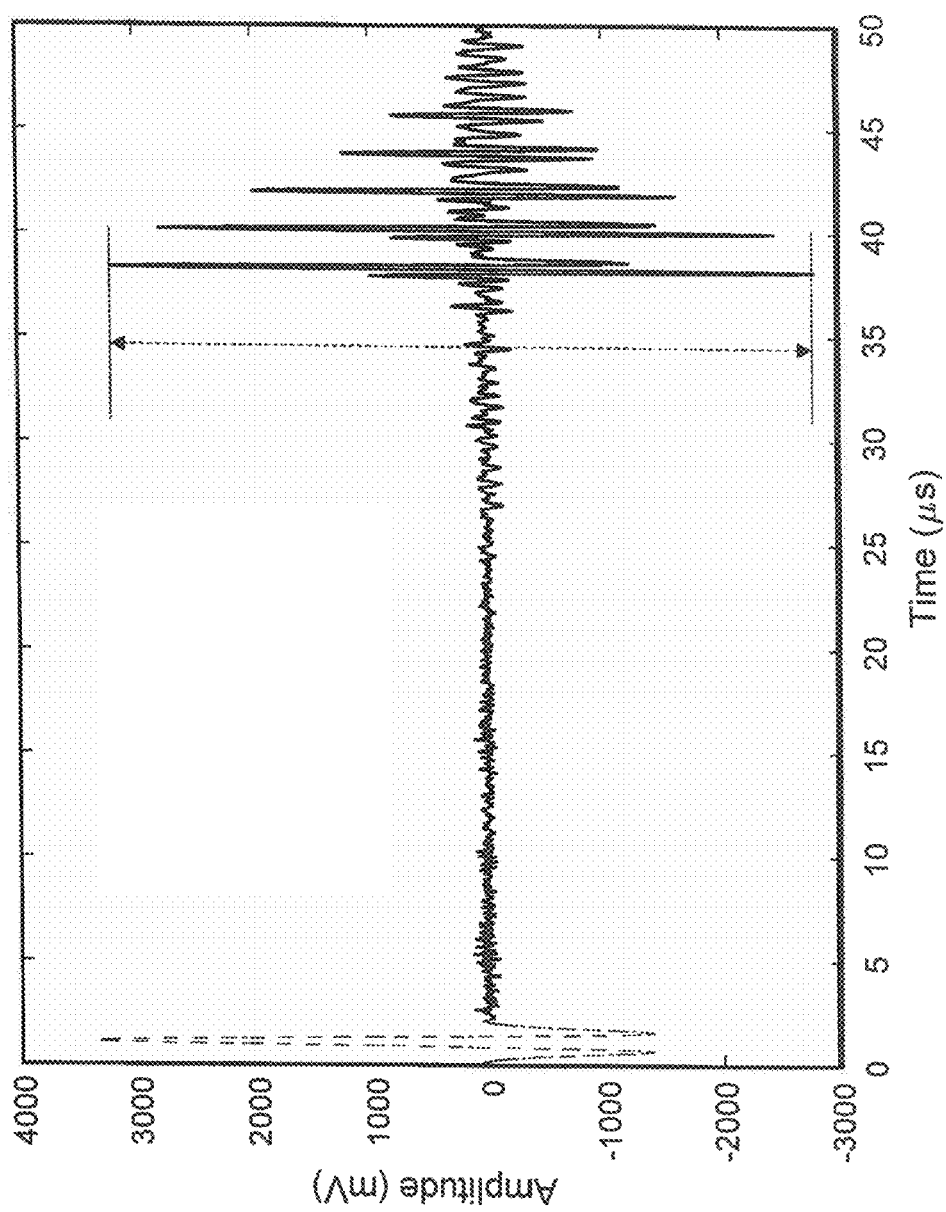
FIG. 12 is a superimposed plot of both the excitation Gaussian pulse and the resulting received signal showing the peak-to-peak amplitude of the first arrival signal through a pipe.

The electronics utilized are the same as those shown in FIG. 8. The AWG in the present situation sends out the chosen pulse, such as a Gaussian pulse at a rate that is varied from 10 KHz to 100 Hz, as desired. A typical value is 1 kHz rate. The A-D conversion rate can be as low as 10 MHz but a digitization rate of 25 MHz has typically been used. Higher rates provide higher time resolution, but this is not necessary for most situations with very fast flow with a lot of gas present. For each pulse that is sent out, the observed received signal is shown in FIG. 12. For comparison purposes the transmitted Gaussian pulse is also superimposed. The transmitted Gaussian pulse is also digitized simultaneously by the ADC as shown in FIG. 12 and this allows an accurate determination of the time of travel from the transmitter 12 to the receiver 14. FIG. 12 shows a series of sharp pulses with decreasing amplitude and separated by a fixed time interval (~2 µs). In FIG. 12, the first arrival pulse is around 38 µs. This is the transmitted signal that arrives by the most direct route from the transmitter transducer, through the first wall, then through the fluid, and arriving at the receiver transducer after passing through the second wall of the pipe (walls on the diametrically opposites sides of the diameter of the pipe). The same pulse also undergoes multiple reflections in the pipe walls and arrives delayed by the time it takes to traverse the pipe wall thickness twice. Since a normal pipe has the same wall thickness all around the reflections from opposite walls overlap in time. If the material of the pipe is known, the thickness of the wall can be measured or monitored accurately in real-time. Moreover, since the decay of the amplitude of subsequent reflections depends on the acoustic impedance (density×sound speed) mismatch between the wall material and the fluid inside, it is possible to extract the fluid density from this amplitude decay. The sound speed in the fluid can be derived simply from the time of arrival of the first pulse after subtracting the time of peak of the Gaussian pulse. Therefore, the sound speed in the fluid can be monitored in real-time and continuously as well.

Normally, when sound is excited by a transducer attached to a pipe, it excited guided waves in the pipe as well that propagates along the circumference of the pipe and arrives at the receiver. Depending on the geometry of the pipe (diameter, wall thickness, and wall material), this indirect path (circumferential path) signal can arrive very close to the direct path signal. For example, a typical 2-in (O.D.) steel pipe filled with water, the circumferential wave signal arrives approximately 1.5 µs before the (the small spike just before the first arrival signal). When the fluid is water, the signal through water is many time stronger than the circumferential path signal and does not cause any problems. However, when there is a large quantity of gas inside the pipe or the fluid is highly attenuating, the liquid path signal can become comparable in amplitude as the signal along the pipe wall. This is where the Gaussian (or Sinc) pulse provides excellent time resolution and a clean signal that other pulse shapes cannot and can be easily discriminated by simply discarding anything before a threshold time to eliminate the interfering signal. If the A-D conversion rate is low or the bandwidth of the transducer of the Gaussian pulse is low, there is an overlap of these signals that cannot be easily separated and it can introduce significant errors in the peak-peak amplitude or RMS (root-mean-square) measurements. This is the reason for using a Gaussian pulse as this type of GVF measurement will otherwise be prone to significant error using other type of excitations. Sharper pulses will produce ringing and spreading of the pulse shape. This is what is done in commercial pulse-echo systems where the focus is to produce the shortest pulse and not as much on what provides better pulse localization and clean shape. It may be observed from FIG. 12, that the excitation Gaussian pulse and the received series of Gaussian pulses are very similar in shape and well defined in structure and clarity.

Figure 13:
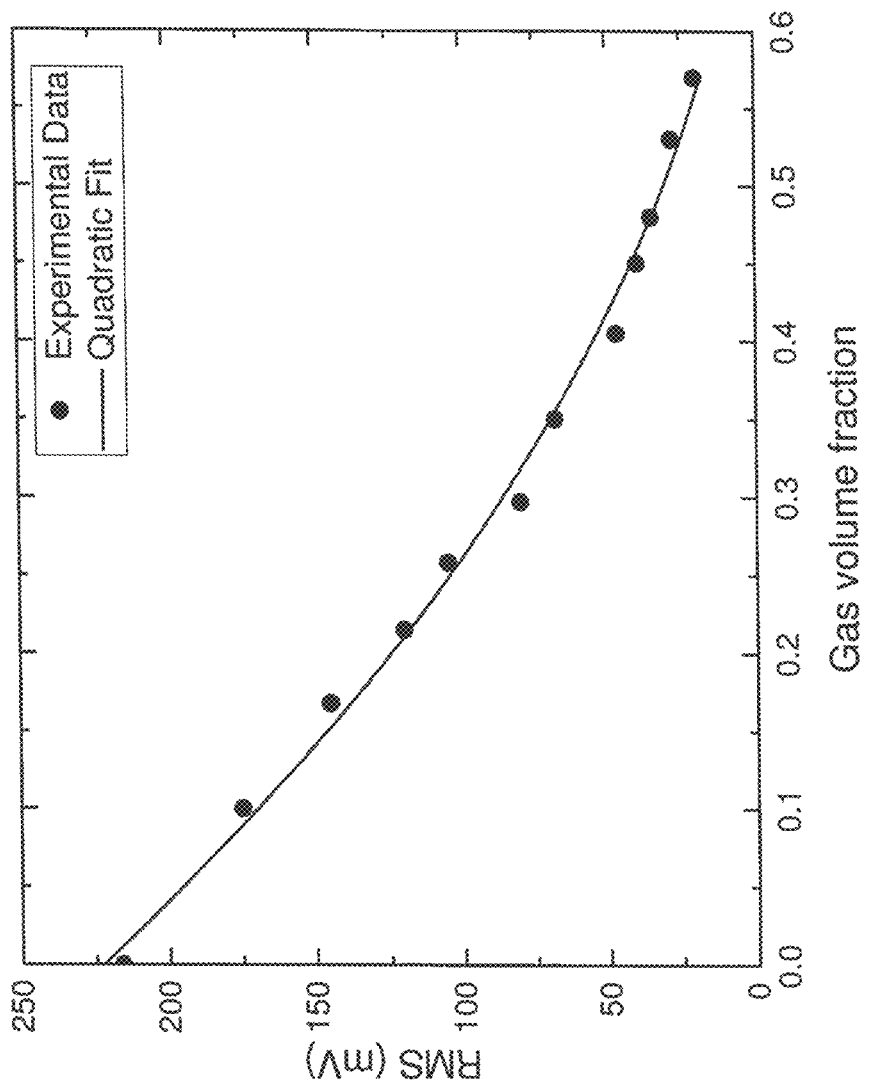
FIG. 13 shows the behavior of the RMS (root-mean-square) value of the first arrival signal (see FIG. 12) as a function of GVF (gas volume fraction).

The DSP analyzes the digitized received signal and extracts the peak-peak amplitude of the first arrival signal and then converts it to an RMS value. FIG. 13 shows a graph of this RMS value of the first arrival signal as a function of GVF (gas volume fraction). This is accomplished by introducing a known volume of gas into the pipe at a location approximately 50 cm below the position of the transducers (transmitter-receiver pair) with liquid flowing through it. The peak-peak amplitude can be used as well instead of the RMS value. A digital oscilloscope can be used to extract these values (peak-peak, RMS, etc.) and display them on the screen or record them in a computer interfaced with the oscilloscope.

FIG. 13 shows the experimental data (black solid circles) and a simple 2nd-order polynomial fit to the experimental data (solid line). Each experimental data point represent 64 averages of the RMS data, meaning averaging the result of 64 separate pulses. The number 64 is arbitrarily chosen to obtain very steady data and lower averages can be used as well. The reason for the averaging is that the flow of fluid with gas (e.g., bubbly fluid) is a dynamic system where the density and the composition is fluctuating in time. Thus, the peak-peak value is constantly fluctuating and, therefore, averaging provides a steady value for a given GVF. Even with 64 averages at 1 kHz pulse rate, the time of each measurement is as short as 64 ms. The pulse rate can be easily increased to 10 kHz with the electronic we have. Although the electronics can handle a higher rate, it is not desirable to go much faster because one needs to allow time for the initial pulse to decay to a small value. FIG. 12 shows only the first set of pulses that only include multiple reflections in the wall. However, the complete packet of signal (the bunch of wall reflections is defined as the packet here) also bounces back and forth between the opposite walls through the liquid. For example, the first major echo will arrive around 100 µs with each subsequent spaced apart by 100 µs. These however, decay very quickly unless it is a pure fluid. Measurements are therefore typically taken at a 1 kHz rate such that all the reflections within the pipe diameters have completely died down.

If it is necessary to observe very fast fluctuations in a highly dynamic multiphase flow system, then each peak shown in FIG. 12 (the ones with 2 µs time separation and decreasing amplitude) can be tracked instead of only the first arrival peak. In this case, fluctuations in time scale as fast a few microsecond can be observed.

Currently, the present flow dynamics measurements are only possible with optical fluctuation or electrical conductivity fluctuation. Optical measurements require a transparent window and can work only with clear fluids. Moreover, even a small amount of gas (bubbly fluid) can obstruct and extinguish the signal completely. Such measurements can be done in crude oil only if there is a transparent window in the pipe (a highly undesirable and impractical situation). For electrical conductivity fluctuation measurements, it is necessary to insert electrodes into the pipe, again an impractical solution. The third solution is gamma ray intensity fluctuation monitoring but that requires a radioactive source and government approval, not practical in many cases.

The approaches presented in this inventions circumvents the difficulties of the conventional techniques and are easy to implement.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for measuring a gas volume fraction in a liquid-comprising fluid contained within a section of pipe, the section of pipe having an outer surface and a longitudinal axis, the method, comprising:
    exciting, at a location on the outer surface of the section of pipe, and containing the liquid-comprising fluid, in a plane perpendicular to the longitudinal axis, the section of pipe and the liquid-comprising fluid contained therein with a continuous chosen frequency equal to or greater than a coincidence or critical frequency of radiation of the section of pipe and liquid-comprising fluid;
    measuring, on the outer surface of the section of pipe in the plane perpendicular to the longitudinal axis in which the excitation of the section of pipe is performed and diagonally opposite to the location, the vibration amplitude of the pipe section responsive to the applied chosen frequency;
    determining the standard deviation of the vibration amplitude of the pipe section over a chosen time period;
    determining the mean value of the vibration amplitude over the chosen time period;
    dividing the standard deviation by the mean value forming a ratio; and
    comparing the ratio with calibration values for the ratio as a function of gas volume fraction, and determining the gas volume fraction in the fluid therefrom.

2. The method of claim 1, wherein the fluid comprises an oil/water mixture.

3. The method of claim 1, wherein the fluid is flowing through the section of pipe.

4. The method of claim 1, wherein acoustic transducers external to the pipe section are utilized for said exciting the section of pipe with a continuous chosen frequency.

5. The method of claim 4, wherein the acoustic transducers comprise contact or non-contact transducers.

6. The method of claim 4, wherein the acoustic transducers comprise piezoelectric transducers.

7. The method of claim 1, wherein said measuring the vibrational amplitude of the pipe section is performed using a vibration detector chosen from contact transducers, electromagnetic acoustic transducers, and laser vibrometers.

8. A method for measuring gas volume fraction in a fluid, comprising:
providing a section of pipe comprising an outer surface and an inner volume within which a gas-bubble containing liquid is disposed, said section of pipe extending along a longitudinal axis;
exciting the section of pipe, in a plane perpendicular to the longitudinal axis, with a pulse having a chosen center frequency, and a bandwidth, at a location on the outer surface of the section of pipe;
measuring the peak-to-peak amplitude of vibrations of the pipe section responsive to the applied pulsed frequency;
converting the peak-to-peak amplitude of vibrations of the pipe section to a root-mean-squared (RMS) value; and
determining, based on a comparison of the RMS value to calibration values for the RMS value as a function of gas volume fraction, the gas volume fraction in the fluid.

9. The method of claim 8, wherein the center frequency is between about 1 MHz and about 4.5 MHz.

10. The method of claim 9, wherein the bandwidth is between about 500 kHz and about 5 MHz.

11. The method of claim 10, wherein the pulse has a duration of 5 µs.

12. The method of claim 11, wherein the pulse is applied at a rate of between 10 kHz and about 100 kHz.

13. The method of claim 8, wherein said step of measuring the amplitude of vibrations of the pipe section is performed on the outer surface of the section of pipe section in the plane perpendicular to the longitudinal axis in which the step of excitation of the section of pipe is performed, and diagonally opposite to the location.

14. The method of claim 8, wherein the fluid comprises an oil/water mixture.

15. The method of claim 8, wherein the fluid is flowing through the section of pipe.

16. The method of claim 8, wherein acoustic transducers external to the pipe section are utilized for said step of exciting the section of pipe with a pulsed chosen frequency.

17. The method of claim 16, wherein the acoustic transducers comprise contact or non-contact transducers.

18. The method of claim 16, wherein the acoustic transducers comprise piezoelectric transducers.

19. The method of claim 8, wherein said step of measuring the vibrational amplitude of the pipe section is performed using a vibration detector chosen from contact transducers, electromagnetic acoustic transducers, and laser vibrometers.

20. The method of claim 8, wherein the pulse is a Gaussian pulse.

21. The method of claim 8, wherein the pulse is a Sinc pulse.

22. A method for measuring the gas volume fraction in a fluid, the method comprising:
exciting a section of pipe having an outer surface and a longitudinal axis, and containing the fluid, in a plane perpendicular to the longitudinal axis, with a continuous chosen frequency equal to or greater than the coincidence or critical frequency of radiation of the pipe section and fluid at a first location on the outer surface of the section of pipe;
measuring, on the outer surface of the section of pipe at a second location diagonally opposite the first location in the plane perpendicular to the longitudinal axis, the vibration amplitude of the pipe section responsive to the applied chosen frequency;
dividing a standard deviation of the vibration amplitude of the pipe section over a chosen time period by a mean value of the vibration amplitude of the pipe section over the chosen time period to form a ratio, comparing the ratio with calibration values for the ratio as a function of gas volume fraction; and
determining the gas volume fraction in the fluid therefrom.

23. The method of claim 22, wherein the center frequency is between about 1 MHz and about 4.5 MHz.

24. The method of claim 23, wherein the bandwidth is between about 500 kHz and about 5 MHz.

25. The method of claim 24, wherein the pulse has a duration of 5 µs.

26. The method of claim 25, wherein the pulse is applied at a rate of between 10 kHz and about 100 kHz.

27. The method of claim 22, wherein said step of measuring the amplitude of vibrations of the pipe section is performed on the outer surface of the section of pipe section in the plane perpendicular to the longitudinal axis in which the step of excitation of the section of pipe is performed, and diagonally opposite to the location.

28. The method of claim 22, wherein the fluid comprises an oil/water mixture.

29. The method of claim 22, wherein the fluid is flowing through the section of pipe.

30. The method of claim 22, wherein acoustic transducers external to the pipe section are utilized for said step of exciting the section of pipe with a pulsed chosen frequency.

31. The method of claim 30, wherein the acoustic transducers comprise contact or non-contact transducers.

32. The method of claim 30, wherein the acoustic transducers comprise piezoelectric transducers.

33. The method of claim 22, wherein said step of measuring the vibrational amplitude of the pipe section is performed using a vibration detector chosen from contact transducers, electromagnetic acoustic transducers, and laser vibrometers.

34. The method of claim 22, wherein the pulse is a Gaussian pulse.

35. The method of claim 22, wherein the pulse is a Sinc pulse.

* * * * *